United States Patent
Krause

(10) Patent No.: US 12,312,801 B2
(45) Date of Patent: May 27, 2025

(54) BRACKET ASSEMBLY INCLUDING A FIBER REINFORCED POLYMER BRACKET HAVING A BACKER AND METHOD OF USE THEREOF

(71) Applicant: Advanced Architectural Products, LLC, Allegan, MI (US)

(72) Inventor: G. Matt Krause, Allegan, MI (US)

( * ) Notice: Subject to any disclaimer, the term of this patent is extended or adjusted under 35 U.S.C. 154(b) by 97 days.

(21) Appl. No.: 17/977,811

(22) Filed: Oct. 31, 2022

(65) Prior Publication Data
US 2023/0134969 A1 May 4, 2023

Related U.S. Application Data

(60) Provisional application No. 63/273,716, filed on Oct. 29, 2021.

(51) Int. Cl.
*E04B 1/38* (2006.01)
*B32B 1/00* (2024.01)
*B32B 15/08* (2006.01)

(52) U.S. Cl.
CPC ............. *E04B 1/388* (2023.08); *B32B 1/00* (2013.01); *B32B 15/08* (2013.01); *E04B 2001/389* (2023.08)

(58) Field of Classification Search
CPC ..... E04B 1/388; E04B 2001/389; B32B 1/00; B32B 15/08; E04F 13/0803; E04F 13/0805; E04F 13/0819; E04F 13/12; E04F 13/0817; F16B 5/02
See application file for complete search history.

(56) References Cited

U.S. PATENT DOCUMENTS

| | | | |
|---|---|---|---|
| 4,461,134 A * | 7/1984 | Lowe | E04C 3/07 29/897.35 |
| 9,879,419 B2 * | 1/2018 | Krause | E04F 13/12 |
| 10,787,817 B1 * | 9/2020 | Bilge | E04F 13/12 |
| 2012/0085042 A1 * | 4/2012 | Macdonald | E04F 13/0826 52/302.1 |
| 2012/0167505 A1 | 7/2012 | Krause | |
| 2013/0152498 A1 | 6/2013 | Krause | |
| 2013/0186027 A1 * | 7/2013 | Sharpe | E04F 13/007 52/582.1 |
| 2014/0250811 A1 | 9/2014 | Krause | |
| 2019/0153733 A1 | 5/2019 | Krause | |

FOREIGN PATENT DOCUMENTS

AU 2020223641 A1 * 8/2021

* cited by examiner

*Primary Examiner* — Omar F Hijaz
(74) *Attorney, Agent, or Firm* — The Watson IP Group, PLC; Jovan N. Jovanovic

(57) ABSTRACT

A bracket assembly comprising a bracket member, and a backer. The bracket member comprises a plurality of fibers contained within a resin matrix. The at least one bracket member includes a body wall and at least one end wall oriented one of oblique and perpendicular to the body wall along at a first end thereof. The bracket member defines a bracket member stiffness. The backer is positioned over a portion of at least one of an inner surface and an outer surface of the at least one end wall. The backer comprises a metal member, and the backer defining a backer stiffness. The bracket member stiffness is between two and twenty times greater than the backer stiffness.

16 Claims, 7 Drawing Sheets

BRACKET ASSEMBLY INCLUDING A FIBER REINFORCED POLYMER BRACKET HAVING A BACKER AND METHOD OF USE THEREOF

CROSS-REFERENCE TO RELATED APPLICATION

This application is claims priority from U.S. Patent App. Ser. No. 63/273,716 filed Oct. 29, 2021, entitled "FIBER REINFORCED POLYMER BRACKET HAVING A BACKER", the entire specification of which is incorporated by reference in its entirety.

BACKGROUND OF THE DISCLOSURE

1. Field of the Disclosure

The disclosure relates in general to building structures, and more particularly, to a bracket assembly having a fiber reinforced polymer bracket with a backer, as well as methods of use thereof.

2. Background Art

In the past, in order to provide a highly thermally efficient (metal) wall or (metal) roof assembly for a building enclosure, it has been necessary for metal materials, typically an exterior and interior metal skin, to be bonded to either side of an insulated panel core inside a factory thereby creating a foam panel. These metal skins are typically profiled and have offsets in them to prevent the exterior metal skin from contacting the interior metal skin. This is done in an effort to prevent metal to metal contact thereby reducing thermal conductivity from the outside of the building. Heat travels in the path of least resistance such that heat can invade a system and affect an interior atmosphere through relatively finite pathways such as fasteners and the like that have metal to metal contact with exterior conditions. Similarly, exterior exposure to cold temperatures can allow for infusion of cold temperatures into a wall construction along highly thermally conductive components.

Some such configurations are disclosed in U.S. Pat. Nos. 8,826,620; 8,833,025; 9,151,052, the entire specification of which is incorporated by reference in their respective entirety.

While the foregoing has been quite successful, there remains a need to provide other structures which have additional benefits and features.

Solutions have been developed, such as the structures disclosed in the incorporated patents set forth above.

SUMMARY OF THE DISCLOSURE

A bracket assembly comprising a bracket member, and a backer. The bracket member comprises a plurality of fibers contained within a resin matrix. The at least one bracket member includes a body wall and at least one end wall oriented one of oblique and perpendicular to the body wall along at a first end thereof. The bracket member defines a bracket member stiffness. The backer is positioned over a portion of at least one of an inner surface and an outer surface of the at least one end wall. The backer comprises a metal member, and the backer defining a backer stiffness. The bracket member stiffness is between two and twenty times greater than the backer stiffness.

In some configurations, the backer comprises a sheet metal member.

In some configurations, the backer comprises a 22 gauge sheet metal member.

In some configurations, the at least one end wall includes a reinforcement channel with the backer being slidably positioned within the reinforcement channel.

In some configurations, the bracket assembly further comprise at least one fastener configured to extend through the at least one end wall of the bracket member and the backer. The at least one fastener comprising a self drilling fastener having a drill point which is one of an AB, #1 or Type 17.

In some configurations, the at least one fastener extends through the at least one end wall of the bracket member and the backer, wherein at least a portion of the backer is deformed into an opening in the bracket member formed by the at least one fastener.

In some configurations, the plurality of fibers further include woven fiber members within the resin matrix, and the at least one fastener that extends through the at least one end wall of the bracket member pushes at least one of the woven fiber members so as to bias the at least one of the woven fiber members against the fastener.

In some configurations, the at least one fastener extended through the at least one end wall defines a fastener bracket pullout value. The at least one fastener extended through the backer defines a fastener backer pullout value. The at least one fastener extended through both the at least one end wall and the backer defines a bracket assembly pullout value. The bracket assembly pullout value is at least 33% greater than the sum of the fastener bracket pullout value plus the fastener backer pullout value.

In some configurations, the bracket assembly pullout value is at least 41% greater than the sum of the fastener bracket pullout value plus the fastener backer pullout value.

In some configurations, the bracket member stiffness is at least ten times greater than the backer stiffness.

In some configurations, the at least one end wall comprises a first end wall, and further comprising a second end wall oriented one of oblique and perpendicular to the body wall along a second end thereof.

In some configurations, the bracket assembly includes a second backer positioned over a portion of at least one of an inner surface and an outer surface of the second end wall, the backer defining a second backer stiffness.

In some configurations, the second backer stiffness corresponds to the first backer stiffness.

In another aspect of the disclosure, the disclosure is directed to a bracket assembly having a bracket member, a first backer, a second backer and at least one fastener. The bracket member comprises a plurality of fibers contained within a resin matrix. The at least one bracket member includes a body wall and a first end wall oriented one of oblique and perpendicular to the body wall along at a first end thereof, and a second end wall oriented one of oblique and perpendicular to the body wall along a second end thereof. Further, the bracket member defining a bracket member stiffness. The first backer is positioned over a portion of at least one of an inner surface and an outer surface of the first end wall. The second backer is positioned over a portion of an inner surface and an outer surface of the second end wall. At least one of the first backer and the second backer comprising a metal member, and also defines a backer stiffness. The bracket member stiffness is between two and twenty times greater than the backer stiffness. The at least one fastener extends through the first end wall and the first backer. The at least one fastener comprises a self drilling fastener having a drill point which is one of an AB, #1 or Type 17.

In some configurations, at least a portion of the first backer member is deformed into an opening in the bracket member formed by the at least one fastener.

In some configurations, the plurality of fibers further include woven fiber members within the resin matrix, and the at least one fastener that extends through the first end wall of the bracket member pushes at least one of the woven fiber members so as to bias the at least one of the woven fiber members against the fastener.

In another aspect of the disclosure, the disclosure is directed to A method of attaching a bracket assembly to an outside surface comprising the steps of: providing a bracket assembly; directing a fastener through the backer, through the at least one end wall and into the outside surface; and deforming at least a portion of the backer is deformed into an opening in the bracket member formed by the fastener during the step of directing.

In some configurations, the fastener comprises a self drilling fastener having a drill point which is one of an AB, #1 or Type 17.

In some configurations, the plurality of fibers further include woven fiber members within the resin matrix, and the fastener that extends through the first end wall of the bracket member pushes at least one of the woven fiber members so as to bias the at least one of the woven fiber members against the fastener.

BRIEF DESCRIPTION OF THE DRAWINGS

The disclosure will now be described with reference to the drawings wherein.

DETAILED DESCRIPTION OF THE DISCLOSURE

Figure 1:
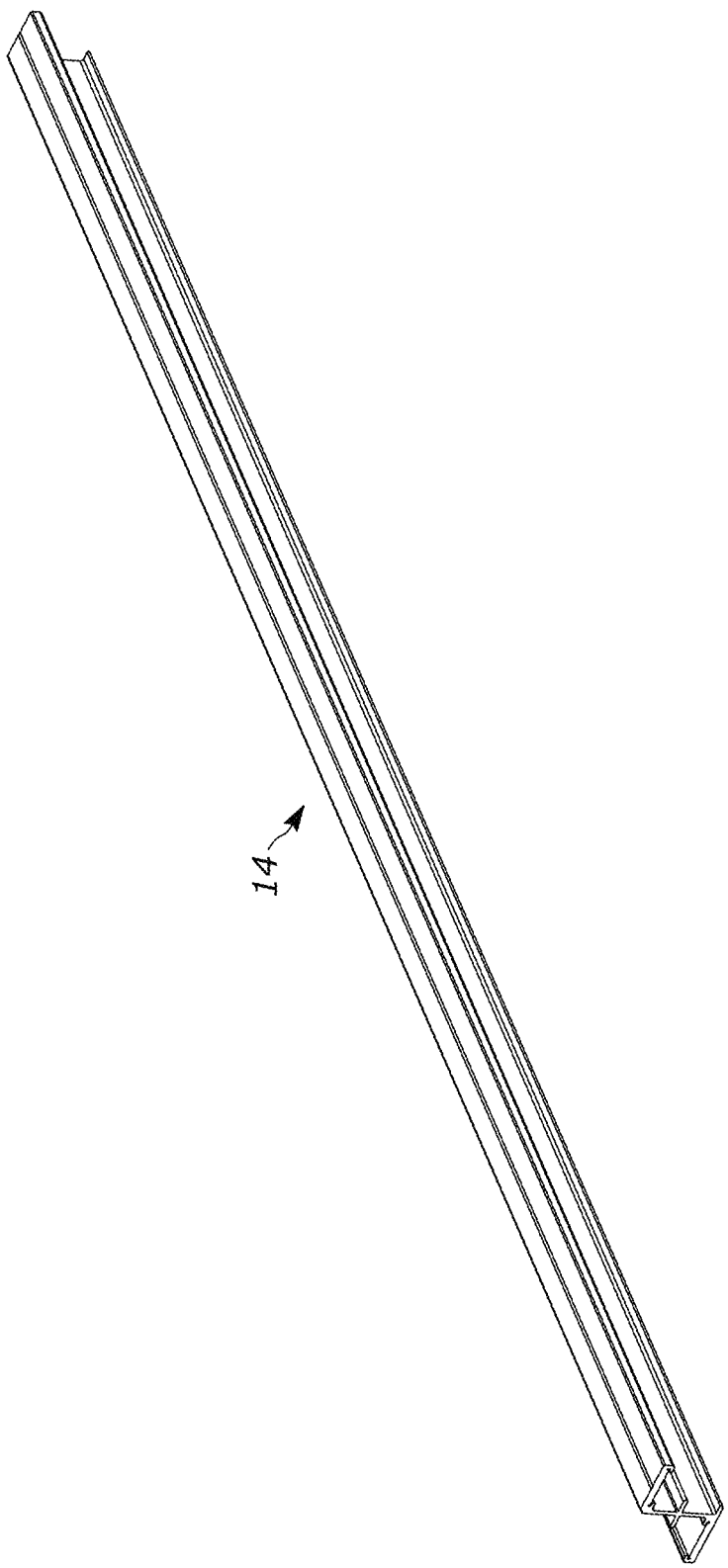
FIG. 1 of the drawings is an exemplary but not to be deemed limiting configuration of a bracket assembly having a fiber reinforced polymer bracket having a backer.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
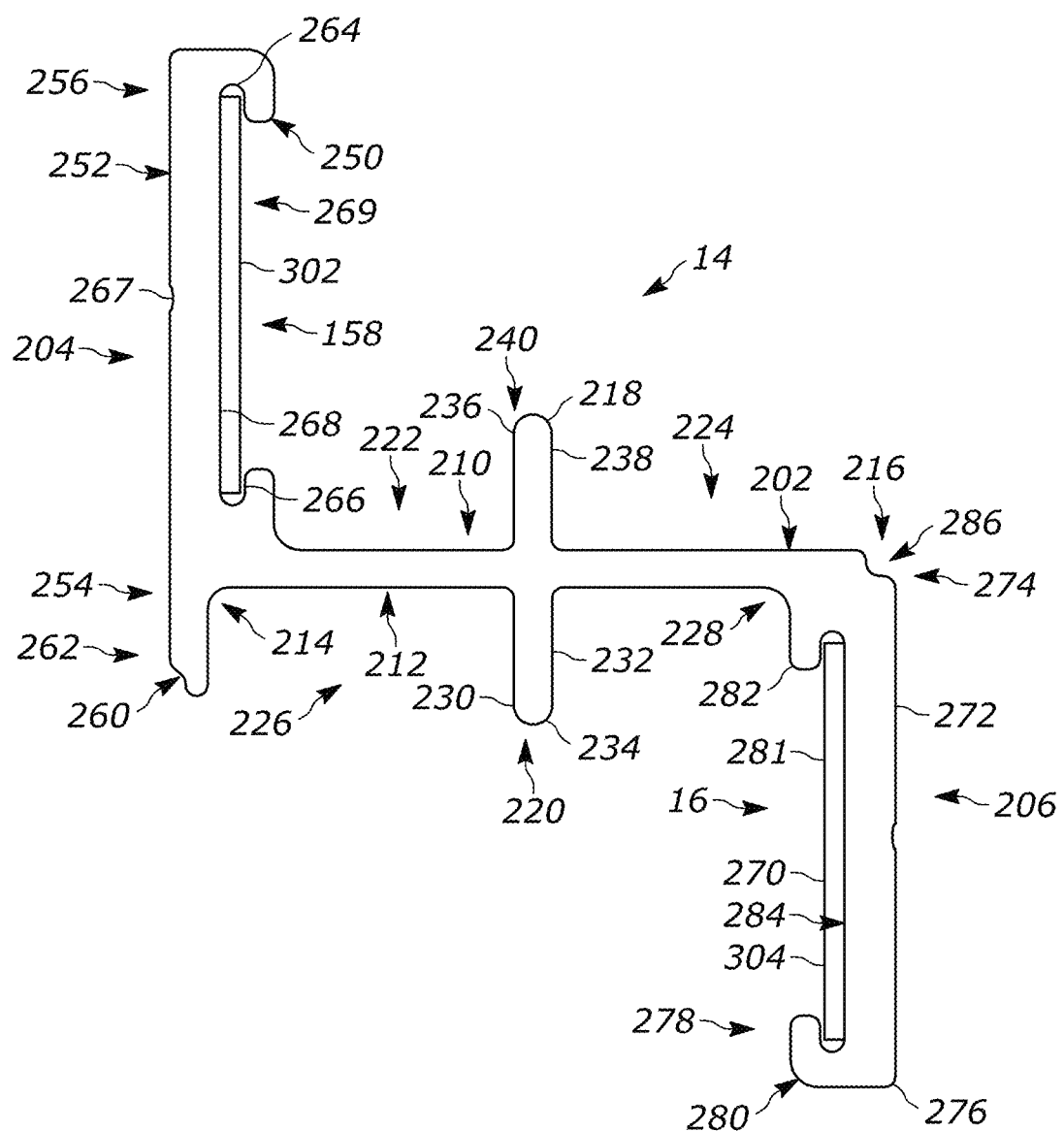
FIG. 2 of the drawings is a cross-sectional configuration of the structure shown in FIG. 1.

Fiber reinforced polymer bracket member 14 (also known in the industry as a "girt") is shown in FIGS. 1 and 2 as cooperating with the backers (i.e., rigidity members 16), forming a bracket assembly. The bracket member itself comprises a polymer member, or a composite member that includes body wall 202, first end wall 204 and second end wall 206. In the embodiment shown, the first end wall 204 is generally perpendicular to the body wall 202 and the end wall 206 is likewise perpendicular to the body wall 202. It is contemplated that the bracket comprises an elongated member which is of a generally uniform cross-sectional shape, with variations that may be positioned along the length thereof.

Typically, such bracket members may be provided in any number of standard sizes that may be from only a couple of feet long to spans that are forty to fifty feet long. It is most preferred that the bracket members comprise a pulltruded profile that includes fibers, preferably, both stranded fiber members and woven fiber members, within a resin matrix. It will be understood that the shape can be formed through one or more pulltrusion dies to achieve the final desired configuration. It is contemplated that a single resin system may be utilized, or that multiple resin systems may be utilized. Of course, the particular configuration and application may dictate changes to the relative thicknesses and dimensions of the different components. Among other fibers, it is contemplated that the fibers may comprise glass fibers (fiberglass), carbon fibers, cellulose fibers, nylon fibers, aramid fibers, and other such reinforcing fibers.

The bracket members provide a thermal break. As used herein, the term "thermal break" refers to a break in like materials wherein the material disposed between like materials is comprised of a material having low thermal conductivity such as a polymeric material having a high R-value as further described below. R-values are measurements of the thermal resistance of different materials. R-values are well known by those skilled in the art of the construction and insulation industries. A high R-value indicates a highly insulative material, such as an R-value of R.2 per inch and higher. Conductive materials have a very low R-value, such as steel which exhibits a negligible or nearly non-existent R-value. In the configuration of the present disclosure, there are no like materials in contact with one another, nor is there any metal to metal contact creating a pathway for heat to transfer from the exterior to the interior and vice versa.

It is also contemplated that the bracket members may comprise anticorrosive polymeric materials that exhibit high insulative qualities or rather, demonstrate high R-value properties such as an R-value in the range of about R.2 to about R8 per inch. Polymeric materials suitable for the present disclosure include thermoplastics or thermoset resin materials including for example: acrylonitrile-butadiene-styrene (ABS) copolymers, vinylesters epoxies, phenolic resins, polyvinyl chlorides (PVC), polyesters, polyurethanes, polyphenylsufone resin, polyarylsulfones, polyphthalimide, polyamides, aliphatic polyketones, acrylics, polyxylenes, polypropylenes, polycarbonates, polyphthalamides, polystyrenes, polyphenylsulfones, polyethersulfones, polyfluorocarbons, bio-resins and blends thereof. Other such thermoplastics and thermoplastic resins suitable for the present disclosure are known in the art which demonstrate high R-values and are thereby heat resistant as well as anticorrosive. Thermoplastics of the present disclosure are also contemplated using a recyclable polymer or are made of a polymeric material which is partially comprised of a renewable resource such as vegetable oil or the like in its composition when an eco-friendly or "green" bracket member is desired. The polymeric material of the present disclosure can also be reinforced with a reinforcing fiber as detailed below. Bracket members composed of the materials discussed above form a thermal break between exterior panels and building substrates in an effort to control the temperature within a building structure by reducing or eliminating thermal conductivity from the exterior panel to the building substrate and vice versa. In assembly, the R-value of an exterior wall panel system of the present disclosure can typically exhibit a R-value from about R.2 to about R30 per inch depending on the thickness of the overall system, the insulation materials used and the composition of the bracket members. Further, microspheres, such as polymeric or glass nanospheres, can be added to the makeup of the brackets to provide further insulative properties and increased R-value expression.

There are several different types of measurements that relate to a materials ability to insulate, resist, transmit or conduct heat across a material. Particularly, a material's K-value relates to a specific material's thermal conductivity, a material's C-value correlates to the material's thermal conductance, a material's R-value relates to a material's thermal resistance, and a U-value relates to the thermal transmittance of an overall system. In designing a wall, roof or deck bracket and panel system providing adequate insulative properties for a building structure, materials with low K-values and C-values are desired while materials with high R-values are desired. When this set of conditions is met, the overall thermal transmittance, or U-value, of the system is low. Thus, the lower the U-value, the lower the rate heat thermally bridges from one material to another. A building structure having a well insulated system will have a much lower U-value than an uninsulated or poorly insulated system exhibiting high thermal transmittance.

Regarding the R-value of the bracket members of the present disclosure, a relatively high R-value is desired to ensure adequate insulation of a building structure from outside elements by making a bracket that creates a thermal break in a wall panel system. A range of R-values for the polymeric materials used to construct the bracket members described above would be a range of about R.2 to about R8 per inch in order to create a thermal break that effectively reduces or eliminates thermal bridging. The thermal conductivity, or K-value, is the reciprocal of the material's R-value, such that for a polymeric material exhibiting an R-value of about R.2 to R8 per inch, the correlating K-value for that material would be from about K5 to about K0.125 per inch. Thus, in comparison to present day metal brackets used in other bracket and panel systems made of iron or steel, a polymeric bracket member of the present disclosure will exhibit a K-value of approximately about K.5 to about K0.125 per inch at a given set of conditions as compared to a bracket made from a metallic material such as iron or steel which would have an approximate K-value as high as K32 to K60 per inch at the same conditions. This is because metallic materials, such as iron and steel, have low or negligible R-values and are well known conductors of heat. Steel is known to have an R-value of about 0.003R per inch. Thus, for example, a steel bracket compared to a polymeric bracket of the present disclosure having an R-value of R.55 would be 183 times more thermally conductive. Some such bracket configurations are sold by the Applicant of the present disclosure under the mark GREEN GIRT, and such configurations are hereby incorporated by reference.

The body wall 202 includes top surface 210 and bottom surface 212 which extend from first end 214 to second end 216, upper rib 218 and lower rib 220. The upper rib extends outwardly from the top surface 210 between the first and second ends, bisecting the top surface into a top first end portion 222 and a top second end portion 224. The upper rib 218 preferably extends substantially perpendicularly to the top surface 210, and, includes first side 236, second side 238 and tip region 240 spanning therebetween. The first side 236 and the second side 238 are generally parallel to each other for at least a portion of the length.

The lower rib 220 preferably extends substantially perpendicularly to the bottom surface 212 of the body wall 202, and, includes first side 230, second side 232 and tip region 234. The lower rib 220 is preferably positioned on the opposite side of the upper rib 218, and has the same dimensions as the upper rib. As with the upper rib, the lower rib bisects the bottom surface 212 into a bottom first end portion 226 and a bottom second end portion 228.

Figure 2A:
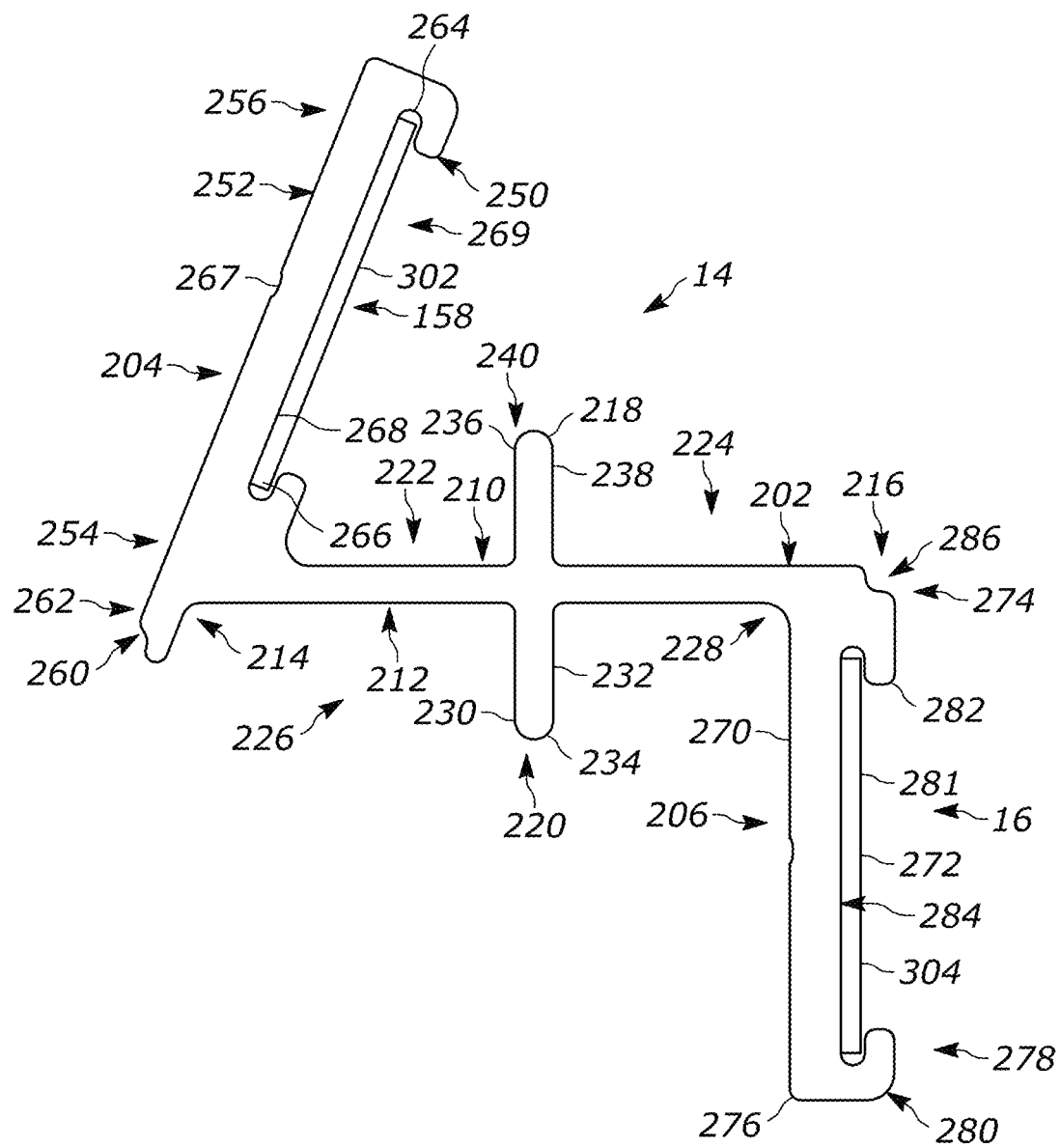
FIG. 2a of the drawings is a cross-sectional configuration of a bracket assembly having a fiber reinforced polymer bracket having a backer, showing in particular, an end wall being oblique to the base wall and a backer being on an outer surface of an end wall.

The first end wall 204 is positioned at the first end of the body wall 202 and, as set forth above, is oblique to (FIG. 2a), or, more preferably perpendicular to (FIG. 2), the body wall 202. In the embodiment shown, the first end wall extends downwardly from the bottom surface 212, and projects downwardly beyond the bottom surface 212 to define a lower flange portion 262. The first end wall 204 includes inside surface 250, outside surface 252, and extends from lower end 254 to upper end 256. The upper end 256 includes lower flange portion 262.

The lower flange portion 262 at a lower end on the outside surface 252 thereof includes a capillary break 260 (in the form of a relief portion which tapers toward the upper edge). As set forth in the incorporated references, the capillary breaks the water tension between it and the cladding or building substrate with which it is in contact so as to act as anti-capillary action grooves for water trapped therebetween or drawn into the joints.

A first reinforcement channel 258 is defined on one of the inside surface and the outside surface of the first end wall, and preferably on the inside surface thereof. The first reinforcement channel 258 includes upper clip portion 264 and lower clip portion 266 spanned on one side by surface 268 and open to the other side defining slot 269. The channel is generally parallel to the outside surface 252 and generally extends the entirety of the inside surface 250 below the bottom surface 212 of the body wall 202.

As will be explained below, first end wall strip 302 is slidably introduced into the first reinforcement channel 258. In certain embodiments, the first end wall strip 302 is relatively snug within the first reinforcement channel 258.

It will further be understood that a guide notch 267 extends on the outside surface 252 and along the length thereof. The guide notch 267 is provided so as to provide a user with a tactile feel for where to begin the insertion of a fastener. By initiating a fastener at the guide notch, it is such that the fastener will be directed into contact at an appropriate portion of the first end wall strip 302 positioned within the first reinforcement channel 258.

The second end wall 206 as shown in FIG. 2 is positioned at the second end of the body wall 202, and is oblique to, or, more preferably perpendicular to, the body wall 202 (and parallel to the first end wall 204). In the embodiment shown, the second end wall extends downwardly from the bottom surface 212 of the body wall 202.

The second end wall includes inside surface 270 and outside surface 272 which extend from inner end 274 (which is at the junction with the body wall 202), to outer end 276. A capillary break 286 having a configuration that matches the capillary break 260 of the first end wall 204.

A second reinforcement channel 278 is defined in one of the inside surface (FIG. 2) and the outside surface (FIG. 2a) of the second end wall, and preferably on the inside surface thereof. The second reinforcement channel includes outer clip portion 280 and inner clip portion 282 which are spanned on one side by surface 284 and which define slot 281 on the other side thereof. The channel is generally parallel to the outside surface 272 of the second end wall, and generally extends the entirety of the inside surface below the lower surface 212 of the body wall 202.

As with the first end wall 204 above, second end wall strip 304 is slidably introduced into the second reinforcement channel 278, preferably, relatively snug therewithin. Preferably, the same materials are utilized for the second end wall strip 304 as with the first end wall strip 302.

It will be understood that the bracket may have different wall configurations which may or may not define a mating relationship with the first and second end wall strips (i.e., the backer). Additionally, in some configurations, the two may merely be glued or adhered together, riveted together or have another mating or fastening configuration. In some configuration the two may be overlaid relative to each other.

While in many of the configurations, the backer, typically a 16 gauge steel has generally the same or similar stiffness as the bracket, surprisingly, it has been found that a backer that has a stiffness that is substantially less than that of the bracket provides beneficial configurations. While it would be conventionally thought that such a configuration would yield a degraded performance, there is a synergistic effect wherein benefits greater than the sum of the bracket and the backer are realized.

In particular, it is contemplated that the backer comprises a material that can conform to at least one of the deflection of the bracket and to the fastener extending therethrough. One such material comprises a 22 gauge steel backer that has the size and configuration of the 16 gauge steel backer (while other thicknesses are likewise contemplated). Such a backer has a stiffness that may be an order of magnitude (10×) less than the bracket member (i.e., a stiffness ratio of 10:1). Of course, the particular stiffness may be between 2 and 20 times less than the bracket member in other configurations. In such a configuration, the deformation of the backer is similar, follows and/or matches the deformation of the bracket member it is believed (without being bound thereto, nor limited thereto) that the configuration minimizes stress singularities and facilitates a synergistic benefits.

Figure 3:
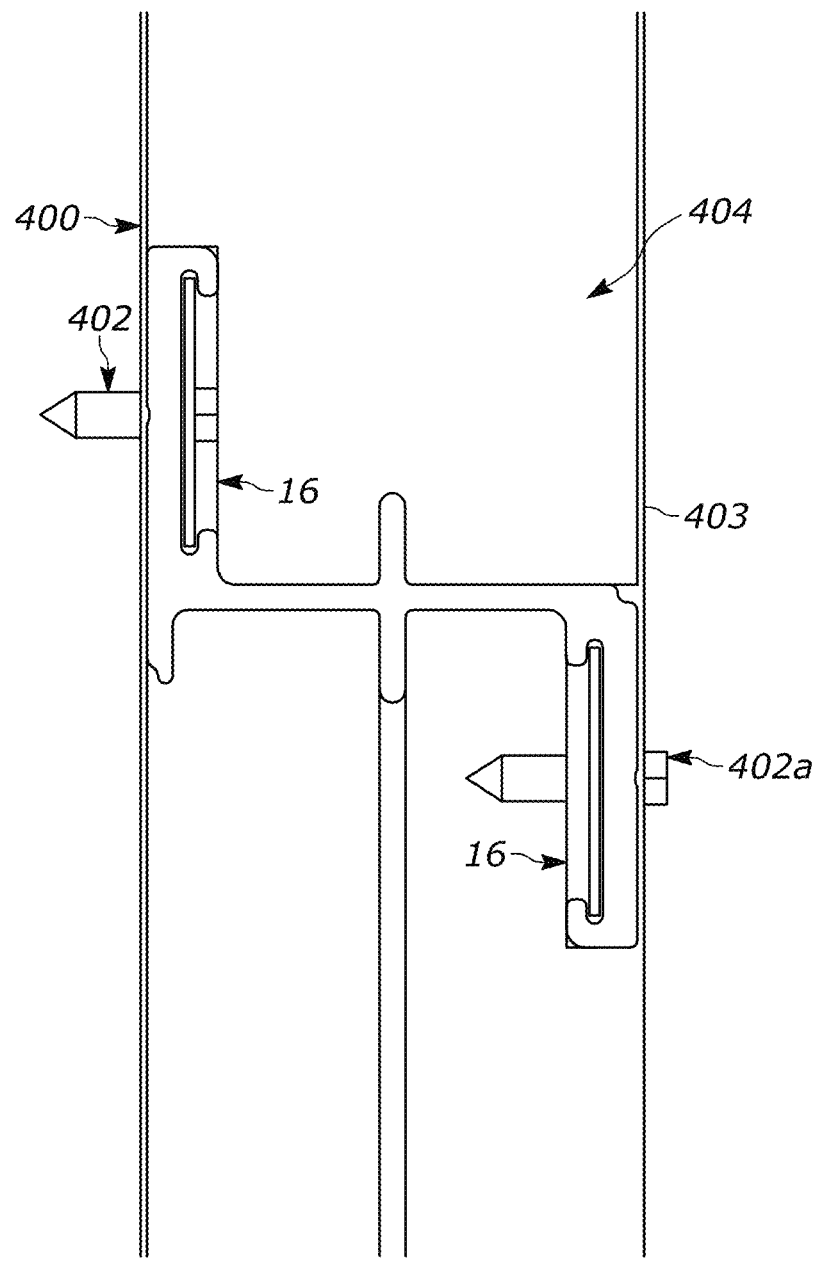
FIG. 3 of the drawings is a cross-sectional configuration of a building structure with the bracket assembly, namely, the fiber reinforced polymer bracket having a backer coupled to the outer surface with a fastener, and retaining insulation.

For example, and with reference to FIG. 3, it has been observed that when attached to an outer surface, such as outer surface 400 with fastener, such as fastener 402, and including cladding 403 with insulation 404, fastener pullout can be enhanced more than 33% beyond their combined individual pullout values. It is believed that such pullout values may be greater than 41% and up to and possibly greater than 245% of their combined individual pullout values.

Figure 4:
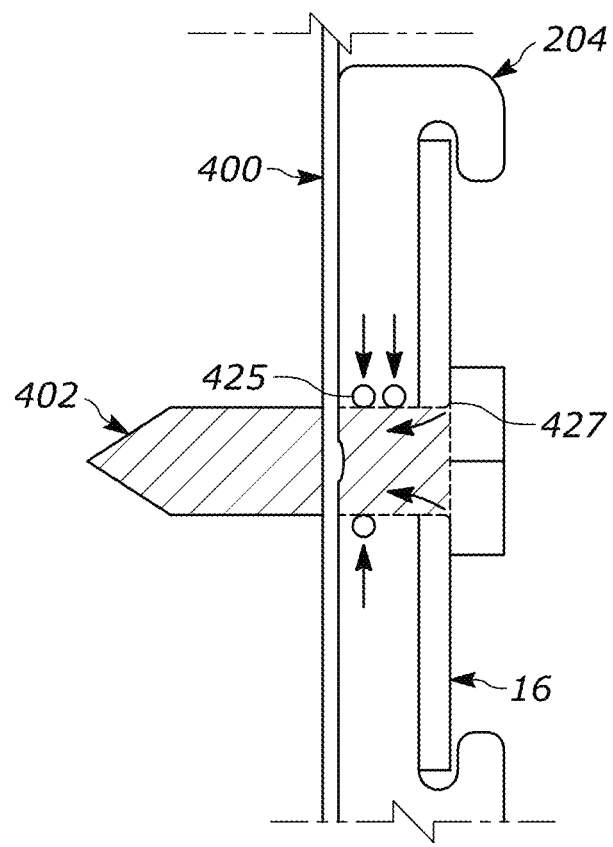
FIG. 4 of the drawings is a partial cross-sectional configuration of a bracket assembly, showing, in particular, the fastener with fibers biased thereagainst and with a portion of the backer being pulled into the opening and deformed by the fastener.

Advantageously, whereas with prior art brackets, a TEKS style fastener (often referred to as a self drilling fastener), having, for example a drill point of a #3 (or somewhere between a #2 and a #5) is typically utilized so as to penetrate the bracket and the backer, it is contemplated that a fastener having a drill point of AB, #1 or Type 17 can be utilized (wherein such drill points are relatively sharp and pointed, as compared to a #1 through #5). The utilization of such fasteners provides an improved retention of the fastener within the bracket and the backer and synergistically the bracket and backer together. First, and with reference to FIG. 4, it is believed (without being bound thereto, nor limited thereto) that the opening formed by such a fastener within the bracket is undersized with the fibers 425 being pushed out of the way and being biased against the fastener along with the resin. Thus, the size of the opening in the bracket is minimized as compared to the larger drill point fasteners described above. Further, the fastener draws the inner portion 427 of the backer surrounding the fastener into the bracket and deforms about the fastener and may also be deformed into the opening of the bracket. Such operation of the bracket, backer and fastener improve retention over prior art configurations. Such fasteners are shown in the 2019. Product Catalog of ITW Buildex of Glendale Heights, Illinois which is incorporated by reference in its entirety.

Figure 5:
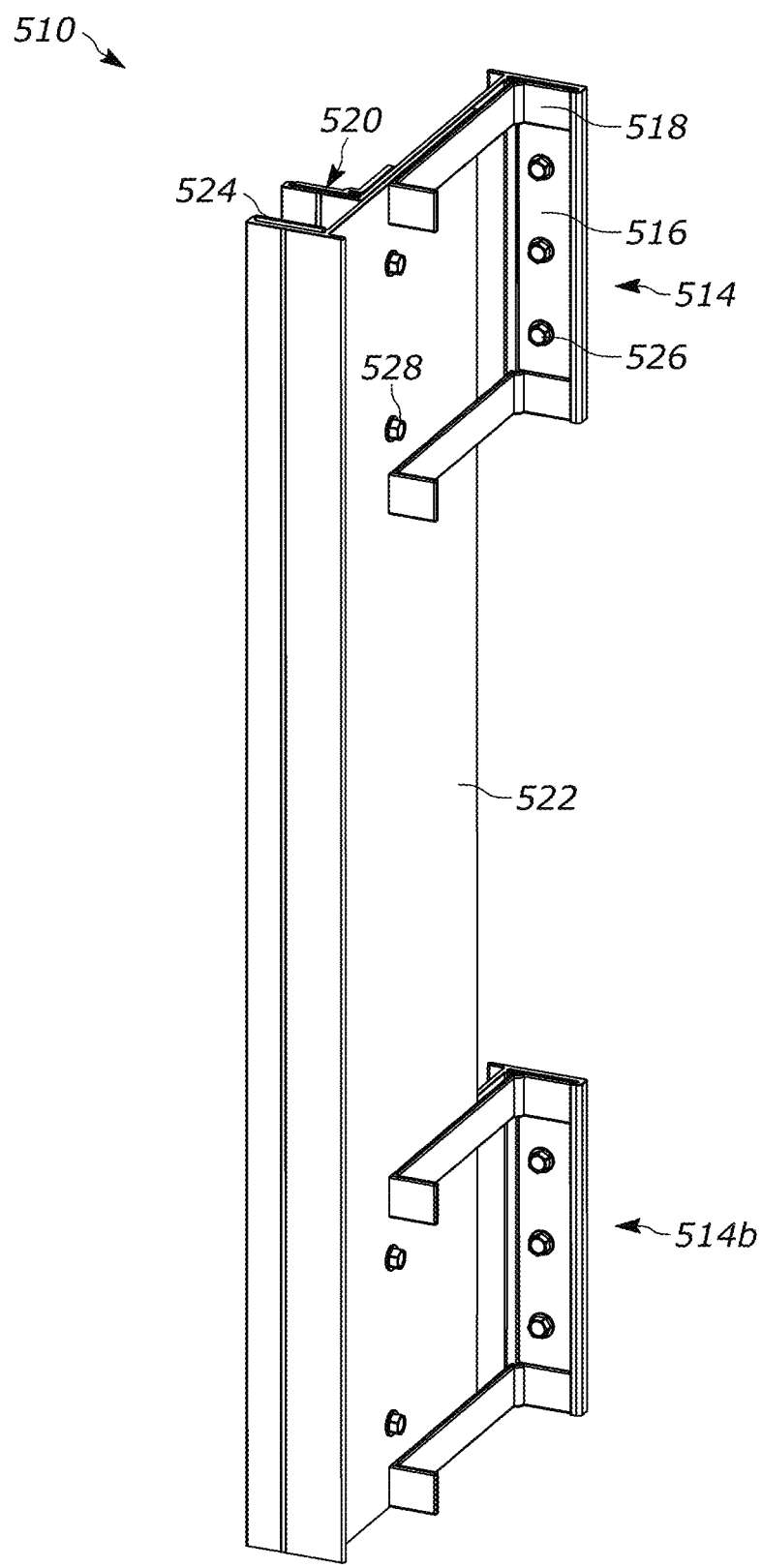
FIG. 5 of the drawings is a perspective view of another configuration of a bracket assembly of the type having a fiber reinforced polymer bracket and a backer.
Figure 6:
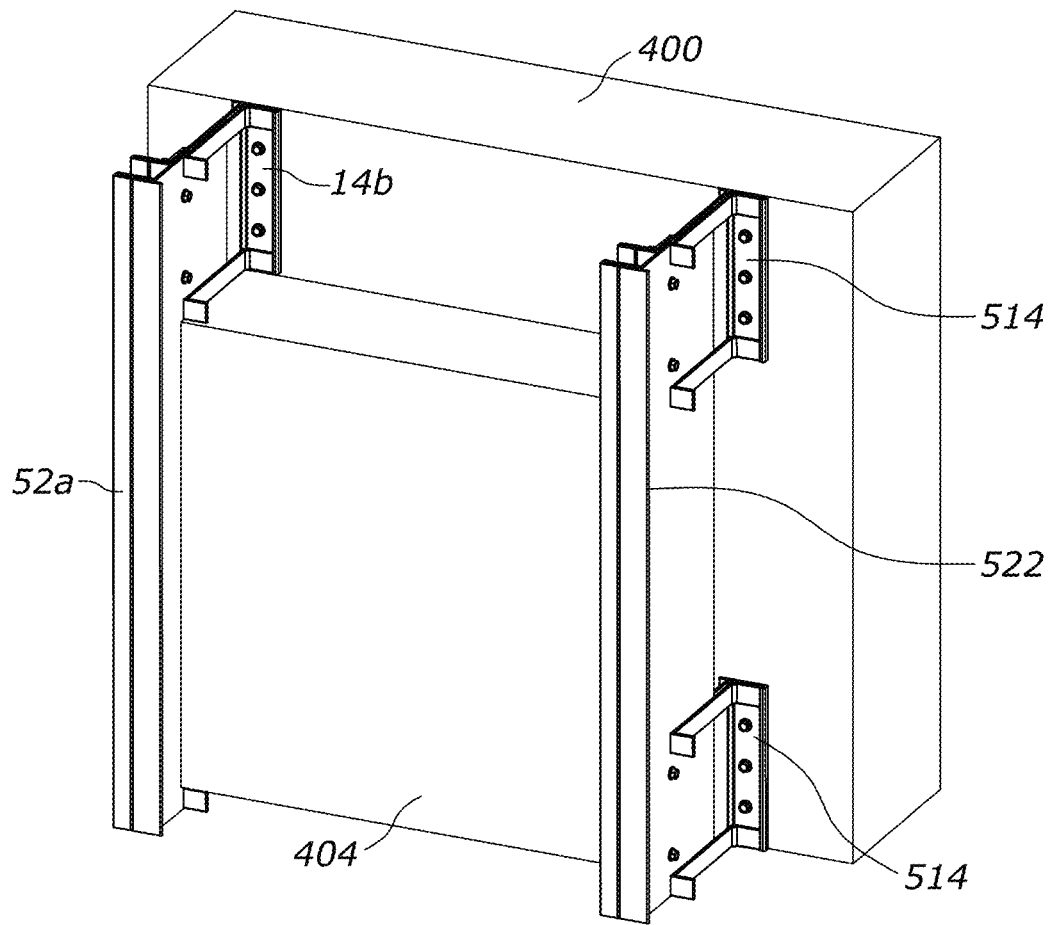
FIG. 6 of the drawings is an installation of a bracket assembly of the type shown in FIG. 5, showing, in particular, coupling thereof to an outer surface and further including insulation.

Of course, the principles herein can be applied to alternative configurations of a bracket of the type utilized in building structures having a backer, and wherein such configurations are coupled to another structure utilizing a fastener. Such configurations may be of the type, for example, shown in FIGS. 5 and 6, and likewise shown in U.S. Patent App. Pub. No. 2021/0404174, entitled Adjustable Support System For a Building Structure and A Wall Structure Having An Adjustable Support System, filed Jun. 25, 2020, the entire specification of which is hereby incorporated by reference in its entirety.

More particularly, in the incorporated application, an adjustable support system 510 is shown as comprising base bracket members 514, 514b, base mounting member 516 that is coupled to one or more the base bracket members and clip members 518, which are likewise coupled to one or more of the base bracket members. A distal mounting member 520 is coupled to an outer flange of the base bracket members 514, 514b. The outer bracket 522 includes a distal coupling member 524 which is coupled thereto. The outer bracket is attached to the base bracket members through fasteners 528 (and through the sandwiched biasing between the base bracket member and the clip member). The base bracket members are attached to an outer surface of a building or other structure through fasteners 526 which likewise extend through the base mounting member 516.

In some configurations, each of the base mounting members 516, the distal mounting member 520, and the distal coupling member 524 may be slidably positionable within channels formed in the respective one of the base bracket members and the outer bracket, or they may be adhered, riveted, co-formed, among others. Each of the base mounting members 516, the distal mounting member 520 and the distal coupling member may be formed in accordance with the present disclosure relative to the configuration and relative stiffnesses of the different components and the use of the fasteners identified herein.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

The invention claimed is:

1. A bracket assembly comprising:
a bracket member comprising a plurality of fibers contained within a resin matrix, the at least one bracket member including a body wall and at least one end wall oriented one of oblique and perpendicular to the body wall along at a first end thereof, the bracket member defining a bracket member stiffness;
a backer positioned over a portion of at least one of an inner surface and an outer surface of the at least one end wall, the backer comprising a metal member, and the backer defining a backer stiffness;
at least one fastener configured to extend through the at least one end wall of the bracket member and the backer, the at least one fastener comprising a self drilling fastener having a drill point which is one of an AB, #1 or Type 17;
wherein the bracket member stiffness is between two and twenty times greater than the backer stiffness;
wherein the at least one fastener extends through the at least one end wall of the bracket member and the backer, wherein at least a portion of the backer is deformed into an opening in the bracket member formed by the at least one fastener
wherein the plurality of fibers further include woven fiber members within the resin matrix, and the at least one fastener that extends through the at least one end wall of the bracket member pushes at least one of the woven fiber members so as to bias the at least one of the woven fiber members against the fastener; and
wherein the at least one fastener extended through the at least one end wall defines a fastener bracket pullout value, and the at least one fastener extended through the backer defines a fastener backer pullout value, and wherein the at least one fastener extended through both the at least one end wall and the backer defines a bracket assembly pullout value, wherein the bracket assembly pullout value is at least 33% greater than the sum of the fastener bracket pullout value plus the fastener backer pullout value.

2. The bracket assembly of claim 1 wherein the backer comprises a sheet metal member.

3. The bracket assembly of claim 2 wherein the backer comprises a 22 gauge sheet metal member.

4. The bracket assembly of claim 1 wherein the at least one end wall includes a reinforcement channel with the backer being slidably positioned within the reinforcement channel.

5. The bracket assembly of claim 1 wherein the bracket assembly pullout value is at least 41% greater than the sum of the fastener bracket pullout value plus the fastener backer pullout value.

6. The bracket assembly of claim 1 wherein the bracket member stiffness is at least ten times greater than the backer stiffness.

7. The bracket assembly of claim 1 wherein the at least one end wall comprises a first end wall, and further comprising a second end wall oriented one of oblique and perpendicular to the body wall along a second end thereof.

8. The bracket assembly of claim 7 further comprising a second backer positioned over a portion of at least one of an inner surface and an outer surface of the second end wall, the second backer defining a second backer stiffness.

9. The bracket assembly of claim 7 wherein the second backer stiffness corresponds to the first backer stiffness.

10. A method of attaching a bracket assembly to an outside surface comprising the steps of:
providing a bracket assembly of claim 1;
directing the fastener through the backer, through the at least one end wall and into the outside surface; and
deforming at least a portion of the backer is deformed into an opening in the bracket member formed by the fastener during the step of directing.

11. The method of claim 10 wherein the fastener comprises a self drilling fastener having a drill point which is one of an AB, #1 or Type 17.

12. The method of claim 10 wherein the plurality of fibers further include woven fiber members within the resin matrix, and the fastener that extends through the first end wall of the bracket member pushes at least one of the woven fiber members so as to bias the at least one of the woven fiber members against the fastener.

13. A bracket assembly comprising:
a bracket member comprising a plurality of fibers contained within a resin matrix, the at least one bracket member including a body wall and a first end wall oriented one of oblique and perpendicular to the body wall along at a first end thereof, and a second end wall oriented one of oblique and perpendicular to the body wall along a second end thereof, the bracket member defining a bracket member stiffness;
a first backer positioned over a portion of at least one of an inner surface and an outer surface of the first end wall, a second backer positioned over a portion of an inner surface and an outer surface of the second end wall, at least one of the first backer and the second backer comprising a metal member, and defining a backer stiffness;
wherein the bracket member stiffness is between two and twenty times greater than the backer stiffness; and
at least one fastener extending through the first end wall and the first backer, the at least one fastener comprising a self drilling fastener having a drill point which is one of an AB, #1 or Type 17;
wherein the at least one fastener extended through the at least one end wall defines a fastener bracket pullout value, and the at least one fastener extended through the backer defines a fastener backer pullout value, and wherein the at least one fastener extended through both the at least one end wall and the backer defines a bracket assembly pullout value, wherein the bracket assembly pullout value is at least 33% greater than the sum of the fastener bracket pullout value plus the fastener backer pullout value.

14. The bracket assembly of claim 13 wherein at least a portion of the first backer member is deformed into an opening in the bracket member formed by the at least one fastener.

15. The bracket assembly of claim 14 wherein the plurality of fibers further include woven fiber members within the resin matrix, and the at least one fastener that extends through the first end wall of the bracket member pushes at least one of the woven fiber members so as to bias the at least one of the woven fiber members against the fastener.

16. A bracket assembly comprising:
a bracket member comprising a plurality of fibers contained within a resin matrix, the at least one bracket member including a body wall and at least one end wall oriented one of oblique and perpendicular to the body wall along at a first end thereof, the bracket member defining a bracket member stiffness;

a backer positioned over a portion of at least one of an inner surface and an outer surface of the at least one end wall, the backer comprising a metal member, and the backer defining a backer stiffness;

at least one fastener configured to extend through the at least one end wall of the bracket member and the backer;

wherein the bracket member stiffness is between two and twenty times greater than the backer stiffness; and wherein the at least one fastener extended through the at least one end wall defines a fastener bracket pullout value, and the at least one fastener extended through the backer defines a fastener backer pullout value, and wherein the at least one fastener extended through both the at least one end wall and the backer defines a bracket assembly pullout value, wherein the bracket assembly pullout value is at least 33% greater than the sum of the fastener bracket pullout value plus the fastener backer pullout value.

* * * * *